United States Patent [19]
Freeman

[11] 3,747,643
[45] July 24, 1973

[54] FLUIDICALLY CONTROLLED SIPHON
[75] Inventor: Peter A. Freeman, Baltimore, Md.
[73] Assignee: Bowles Engineering Corporation, Silver Spring, Md.
[22] Filed: Feb. 18, 1972
[21] Appl. No.: 227,434

Related U.S. Application Data
[62] Division of Ser. No. 842,599, July 19, 1969, Pat. No. 3,675,672.

[52] U.S. Cl. .................. 137/806, 137/344, 239/212
[51] Int. Cl. ........ F15c 1/04, B05b 9/02, E01h 3/02
[58] Field of Search ............... 137/81.5, 216, 216.1, 137/216.2, 218, 344; 239/212, 213

[56] References Cited
UNITED STATES PATENTS
3,346,000  10/1967  Cushing ............................ 137/216
3,277,914  10/1966  Manion ............................. 137/81.5
3,342,392   9/1967  Sowers III ..................... 137/81.5 X
3,417,770  12/1968  Denison ........................... 137/81.5
3,455,324   7/1969  Biem et al. ........................ 137/216
3,467,121   9/1969  Bowles ............................. 137/81.5
3,468,325   9/1969  Bowles ............................. 137/81.5
3,521,656   7/1970  Sukel .............................. 137/81.5
3,566,897   3/1971  Collier ............................ 137/81.5
3,595,259   7/1971  Adams ............................. 137/81.5

Primary Examiner—Samuel Scott
Attorney—Howard L. Rose and Ira C. Edell

[57] ABSTRACT

A fluidic control for a siphon employs venturi action in a fluidic element to create a suction force at the neck of the siphon to initiate siphon flow. The siphon arrangement is disclosed in various liquid flow control embodiments.

10 Claims, 5 Drawing Figures

PATENTED JUL 24 1973
3,747,643
SHEET 1 OF 3

FLUIDICALLY CONTROLLED SIPHON

CROSS REFERENCE

The present application is a division of my co-pending U.S. Pat. application Ser. No. 842,599 filed July 19, 1969 and entitled "Fluidic Irrigation" now U.S. Pat. No. 3,675,672, issued July 11, 1972.

BACKGROUND OF THE INVENTION

The present invention relates to fluidics technology, and in particular to fluidic techniques utilized in controlling irrigation systems.

The need for automation in irrigation is becoming acute in many of the nation's large agriculture areas where natural rain fall must be greatly augmented with irrigation water. The need arises primarily from the increasing costs and shortage of manual labor which has been traditionally used to operate irrigation systems. In limited areas, this problem is being attacked by the automation of sprinkler irrigation systems; however, these require the combination of available electricity at a high power level to operate pumping facilities. The pumps and associated plumbing of sprinkler systems also represent a large capital investment, which is currently economically unfeasible in most of the irrigated farm areas. The automation of surface irrigation systems therefore is currently lacking badly for want of practical low cost technical approach. The automatic irrigation techniques, primarily fluidic techniques, described herein have been well received in the industry and represent a very promising approach to the solution of an eminently serious agricultural problem.

It is therefore a primary object of the present invention to provide techniques for use in automating irrigation control systems.

It is another object of the present invention to employ fluidic techniques for providing relatively inexpensive automatic control capabilities in irrigation control systems.

The overall system concept described herein employs fluidic diverter elements operable in various sequences and combinations of sequences to distribute water as required among a plurality of irrigation ditches. In implementing the system it was necessary to develop novel fluidic diverter elements, novel liquid level detection and control techniques, novel flow shut-off devices, and novel techniques for adapting the irrigation system to changes in the localized environment. These various elements and techniques, as well as the overall system concept, all form a part of the present invention. For example, assume that eight irrigation ditches are to be filled in sequence so that when one ditch fills up flow is to be switched to the second, etc. This can be accomplished automatically by using a series of bistable fluidic diverters and associated liquid level sensors arranged to sequentially switch the diverters accordingly as each ditch is filled. It was found that conventional fluidic bistable elements were not able to divert large mass flows of water nor were they able to respond accurately to conventional liquid level detection and flow control techniques. Consequently novel diverter elements and associated level detection and flow control techniques were conceptualized for particular utilization in irrigation control systems, although these elements and techniques have a somewhat broader application apart from irrigation systems.

It is another object of the present invention to provide novel flow control techniques for facilitating the regulation and shut-off of large mass liquid flows, as required in irrigation systems.

It is still another object of the present invention to provide liquid level detection and control techniques having particular utilization in irrigation control systems.

SUMMARY OF THE PRESENT INVENTION

In accordance with the present invention, a fluidic control device is provided to initiate and terminate flow through a siphon. Siphons are presently in widespread use to transfer water from supply ditches to growing areas in irrigation systems. The present invention utilizes venturi suction from an outlet passage of a fluidic diverter element. When flow in the diverter element is through that outlet passage, venturi action sucks air from the top of the siphon neck, initiating water flow through the siphon. When flow in the diverter is switched to the other outlet passage, ambient air enters the siphon via the venturi section to cut-off siphon flow. The siphon may be rotated to provide different heights of the siphon neck.

BRIEF DESCRIPTION OF THE DRAWINGS

The above and still further objects, features and advantages of the present invention will become apparent upon consideration of the following detailed description of the various specific embodiments thereof, especially when taken in conjunction with the accompanying drawings, wherein.

DETAILED DESCRIPTION OF THE PREFERRED EMBODIMENTS

Figure 1:
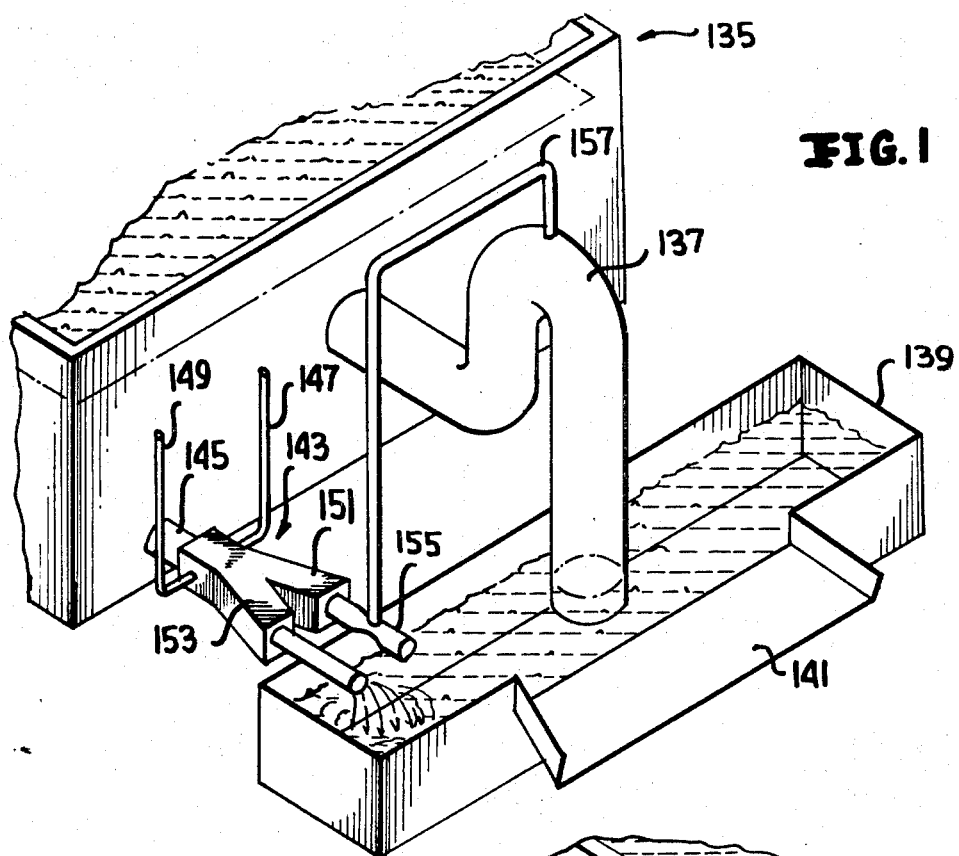
FIG. 1 is a view in perspective of a fluidically controlled siphon constructed in accordance with the principles of the present invention.

Referring specifically to FIG. 1 of the accompanying drawings there is illustrated diagrammatically a fluidically controlled siphon arrangement by means of which water or liquid in a container or reservoir 135 can be selectively made to flow to a desired location, for example to an irrigation ditch. Siphon 137 comprises a tube having its open upstream end in fluid communication with water in reservoir 135, either through an appropriate opening in a wall of the reservoir as illustrated, or by extending over the top of the reservoir wall. The siphon tube has an inverted generally U-shaped configuration with a short horizontal section at its upstream end. The apex or gooseneck section of the siphon tube extends to a height which is above the maximum water level in reservoir 135. The downstream end of the siphon tube extends into a catch basin 139 having a main discharge flume 141 which permits egress of water from the catch basin whenever the water level exceeds the level at the mouth of the flume. The downstream end of the siphon tube extends into catch basin 139 below the level of the mouth of flume 141.

A bistable fluidic pilot diverter valve 143 receives water under pressure from reservoir 135 at its power nozzle 145 via an appropriate opening or aperture in the sidewall of the reservoir. Diverter valve 143 has respective left and right control ports 147 and 149 of the aspiration type and left and right output passages 151 and 153 respectively. Outlet passage 153 is arranged to discharge water received thereby directly into catch basin 139. Outlet passage 151 is provided with a venturi section 155 at its downstream end which is also arranged so that water received by outlet passage 151 is discharged into the catch basin 139. The neck of venturi section 155 is in fluid communication with the interior of siphon 137 at the apex or gooseneck of the latter by means of a suction tube 157.

In operation, when right control port 149 is blocked and left control port 147 is open to permit aspiration of air to element 143, the water power stream discharges from right outlet passage 153 into the catch basin 139. Water in the catch basin eventually covers the downstream end of the siphon. The catch basin continues to fill until the water overflows the discharge flume 141. The water level in the siphon on the upstream side of the siphon gooseneck adjusts to water level in reservoir 135.

When the left control port 147 is blocked and aspiration of air is permitted only through right control port 149 the power stream flow in diverter element 143 issues from left outlet passage 151 into catch basin 139 via venturi section 155. Power stream flow through the venturi section causes a suction or negative pressure in suction tube 157 which draws air from the top of the gooseneck section of the siphon, raising the water level therein in both the upstream and downstream sections. When the level in the upstream section of the siphon 137 rises over the gooseneck section, flow between the reservoir 135 and catch basin begins. With continued aspiration by means of venturi section 155 the siphon achieves full flow.

If now left control port 147 is opened and the right control port 149 is blocked the fluidic element again switches away from venturi section 155 to outlet passage 153. Ambient air now flows into the downstream end of venturi section 155 and through section tube 157 to the siphon gooseneck, increasing the pressure thereat and terminating siphon flow.

It is noted that both outlet passages 151 and 153 of pilot diverter 143 are arranged to discharge fluid into catch basin 139. This is required to maintain the downstream end of the siphon 137 under water so that air can be drawn out of the siphon gooseneck when desired. It is also important that the venturi section of outlet passage 151 be at least partially elevated from the quiescent water level in the fluidic diverter element 143 so that air can enter suction tube 157 and flow to the siphon gooseneck when the diverter element switches to outlet passage 153. It is this air which, upon entering the downstream end of venturi section 155, increases the interior pressure in the siphon sufficiently to stop siphon flow. A further consideration to bear in mind is that the pilot diverter element 143 runs continuously so that its output flow should be kept a minimum.

I have found that the negative pressure or suction which can be generated in the venturi section 155 is approximately fifty to sixty percent of the positive pressure head available at the power nozzle 145. This of course provides a limit as to the height to which water can be raised in the siphon by the suction action of the venturi section.

The fluidically controlled siphon can be modified for proportional flow control as well as on-off control. For example, if fluidic element 143 is of the analog or proportional type, the negative pressure generatd in the venturi section 155 varies proportionally with flow therethrough. Consequently the height to which water can be drawn over the siphon gooseneck is proportional to power stream flow in outlet passage 151. In such an arrangement, the water velocity through the gooseneck section of the siphon 137 should be kept sufficiently low in order that water flow does not entrain air in the top of the gooseneck. The latter condition would cause the siphon to run at full flow rather than as a controlled proprotional funtion of flow diversion in element 143.

Figure 2:
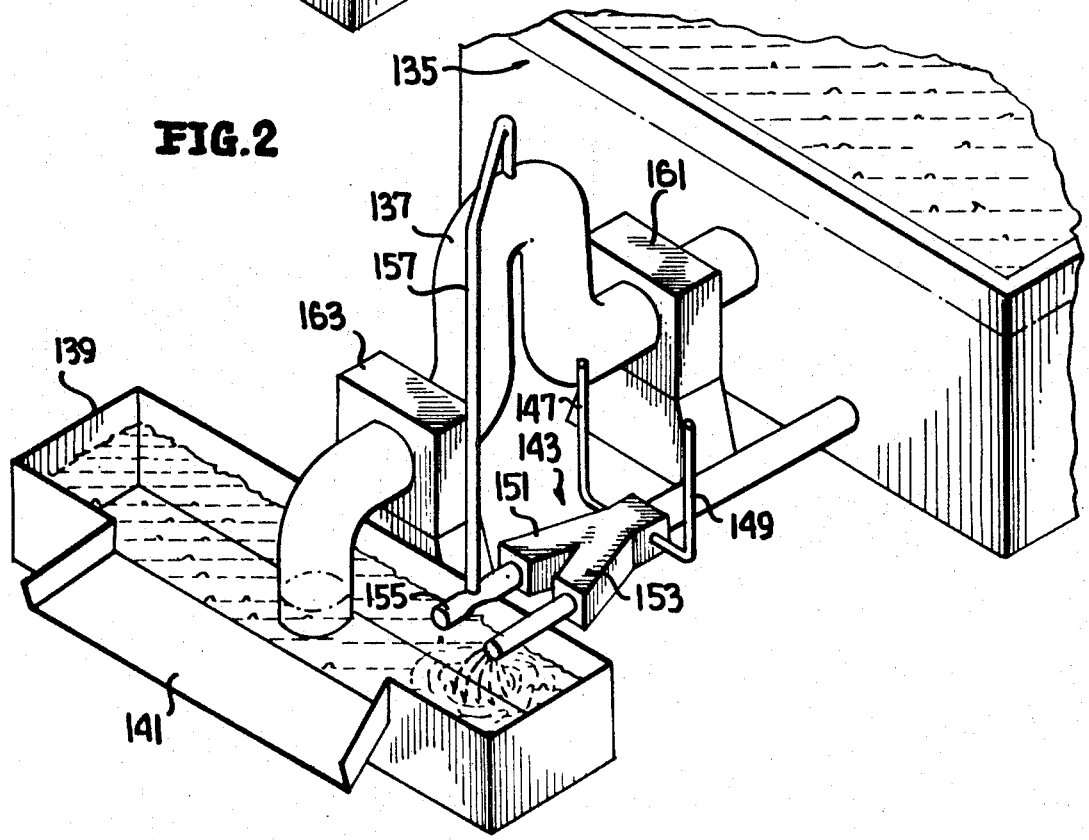
FIG. 2 is a view in perspective of a modification of the embodiment of FIG. 1 wherein the siphon is adjustable in height.

Referring now to FIG. 2 of the accompanying drawings there is illustrated a modification of the arrangement of FIG. 1 whereby the siphon gooseneck or arch is capable of being swiveled to provide an adjustable gooseneck height. The only substantial difference in the arrangements between FIG. 1 and FIG. 2 therefore resides in the provision of two rigidly supported fluid fitting members 161 and 163 which are adapted to receive, in fluid-tight relation, the respective upstream and downstream ends of the gooseneck section of siphon tube 137. The gooseneck section is rotatable in both of the fluid fitting members 161 and 163 so that the height of the gooseneck may be selectively adjusted. The suction tube 157 connecting the siphon arch and the venturi section 155 is of course made flexible in order to accommodate the various possible positions of the movable siphon arch. Upstream fitting member 161 provides fluid communication between the gooseneck section and reservoir 135 via the upstream section of the siphon. The downstream fitting member 163 provides fluid communication between the gooseneck and the catch basin 139 via the downstream section of the siphon.

In operation, the arrangement of FIG. 2 performs identically to the arrangement of FIG. 1 except that the arrangement of FIG. 2 is able to perform in response to lower flow rates through venturi section 155 of elements 143. More specifically, by lowering the siphon arch sufficiently, the water in the siphon can be raised to permit the siphon flow even when the presure head applied to the diverter element is relatively low.

Figure 3:
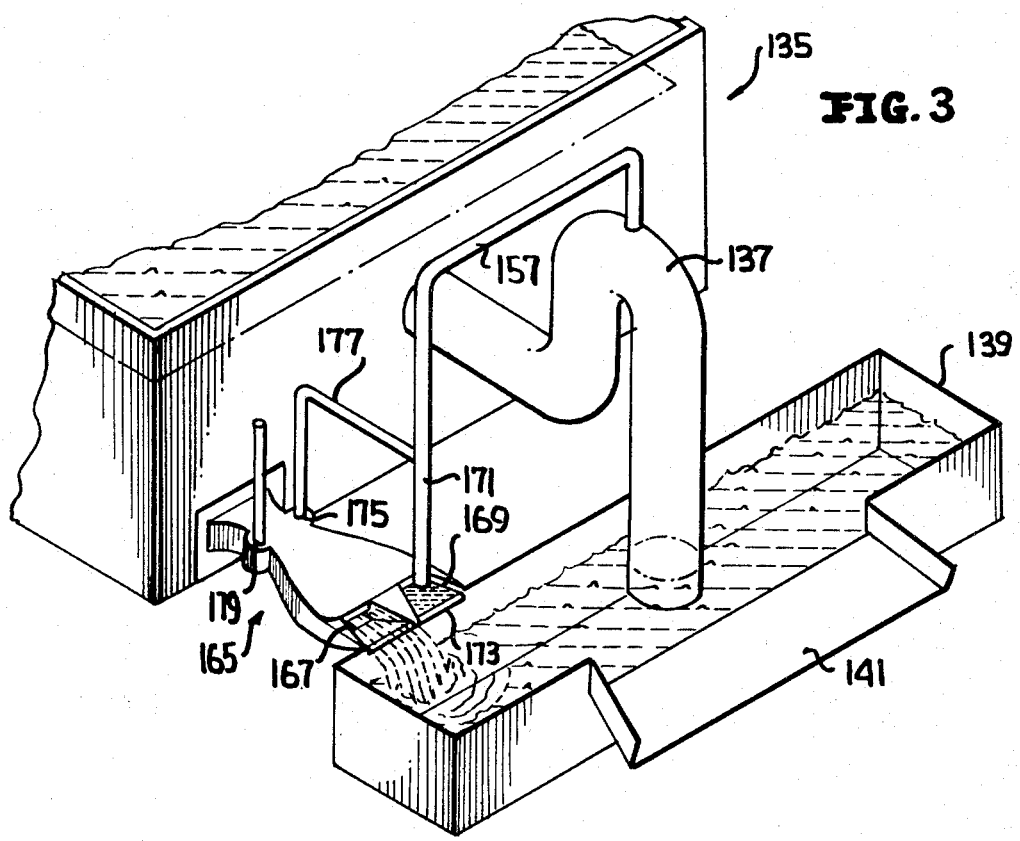
FIG. 3 is a view in perspective of another embodiment of the fluidically controlled siphon of the present invention.

Referring now specifically to FIG. 3 of the accompanying drawings there is illustrated in diagrammatic form an alternate arrangement for fluidically controlling siphon flow. In order to eliminate the venturi section 155 in FIGS. 1 and 2, diverter element 143 is replaced by diverter element 165 which is of the type described above in relation to FIGS. 1–3 of my abovementioned co-pending U.S. Pat. application Ser. No. 842,599, of which this application is a division and which is incorporated by reference herein. As is the case with the arrangement of FIG. 1 herein, the siphon tube 137 has its upstream end communicating with the liquid contents of reservoir 135 and its downstream end disposed in catch basin 139. Diverter element 165 has its inlet opening communicating with the liquid in reservoir 135 and the pressurized liquid is selectively discharged through eight of outlet passages 167 or 169 into catch basin 139. A standpipe 171, comprising a hollow tube, is located with its open bottom end near the exit of outlet passage 169. More specifically the bottom end of standpipe 171 is disposed slightly above the top of the downstream weir 173 in passage 169. Standpipe 171 communicates directly with suction tube 157 which, as described in relation with FIG. 1, communicates with the top of the gooseneck of siphon tube 137. In addition, left control port 175 of diverter 165 communicates via fluid passage 177 with a junction between the standpipe 171 and suction tube 157.

It is important that the bottom of the standpipe 169 be disposed slightly above the weir 173 so that when diverter flow issues from outlet passage 167 air can enter the standpipe and flow to the siphon gooseneck to stop siphon flow. If the standpipe extended below the weir 173 the residual water level of the diverter element 165 would block the bottom of the standpipe, even without flow through passage 169, and thereby block the required air flow. When diverter flow issues from passage 169 the water covers the bottom of the standpipe preventing any substantial air flow into suction tube 157 from standpipe 171.

The operation of the arrangement in FIG. 3 is as follows: When right control port 179 of diverter element 165 is initially uncovered, there is no siphon flow. Water entering the diverter element 165 initially tends to divide between the outlet passages 167 and 169 because of relatively equal air flows entrained into both control ports 179 and 175. As air is drawn from the siphon arch into left control port 175 via passage 177 and suction tube 157 and into standpipe 171 via suction tube 157, the flow in diverter element 165 gradually switches to left output passage 169. More particularly, the inflow to control port 179 remains substantially the same whereas the inflow to control port 175 gradually decreases as more and more of the limited air supply is sucked out of the siphon gooseneck. As more flow switches to left outlet passage 169 the suction capability of control port 175 increases due to the increasing vortical flow in the vortex projection associated with control port 175. This increasing suction raises a column of water in standpipe 171. When enough air is drawn from the siphon 137 water flows over the gooseneck and siphon flow begins. As the flow in the siphon increases, the remaining air in the siphon is washed out by the water flow and the siphon achieves the full flow mode.

When right control port 179 of diverter 165 is blocked, air flow thereinto stops and the power stream begins to switch toward outlet passage 167. When the switching is nearly completed, the water level in outlet passage 169 drops below the bottom of standpipe 171 permitting air to enter the standpipe and be entrained by siphon flow into the siphon via suction tube 157. Air entering standpipe 171 is also entrained into control port 175 assuring that the diverter flow remains directed toward outlet passage 167. The air entering the siphon gradually increases the pressure therein and terminates siphon flow.

As mentioned above, the siphon arrangement illustrated in FIGS. 1, 2 and 3 need not communicate through a wall of the reservoir but instead may be disposed so that the siphon gooseneck straddles the reservoir wall. There is no substantial change in the operation of such an arrangement as compared with the arrangements illustrated in FIGS. 1 through 3.

Figure 4:
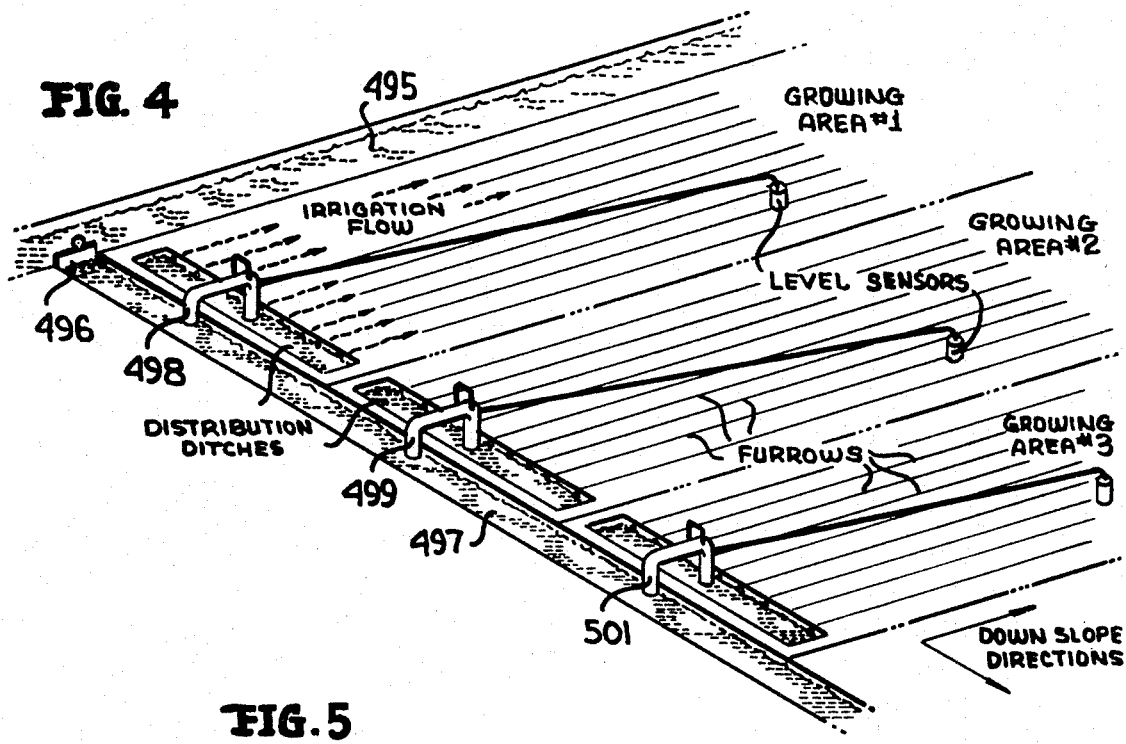
FIGS. 4 and 5 are respective diagrammatic and schematic illustrations of a fluidic irrigation system in a relatively low slope terrain wherein fluidically controlled siphons are employed to conduct liquid from supply ditches to the area to be irrigated.
Figure 5:
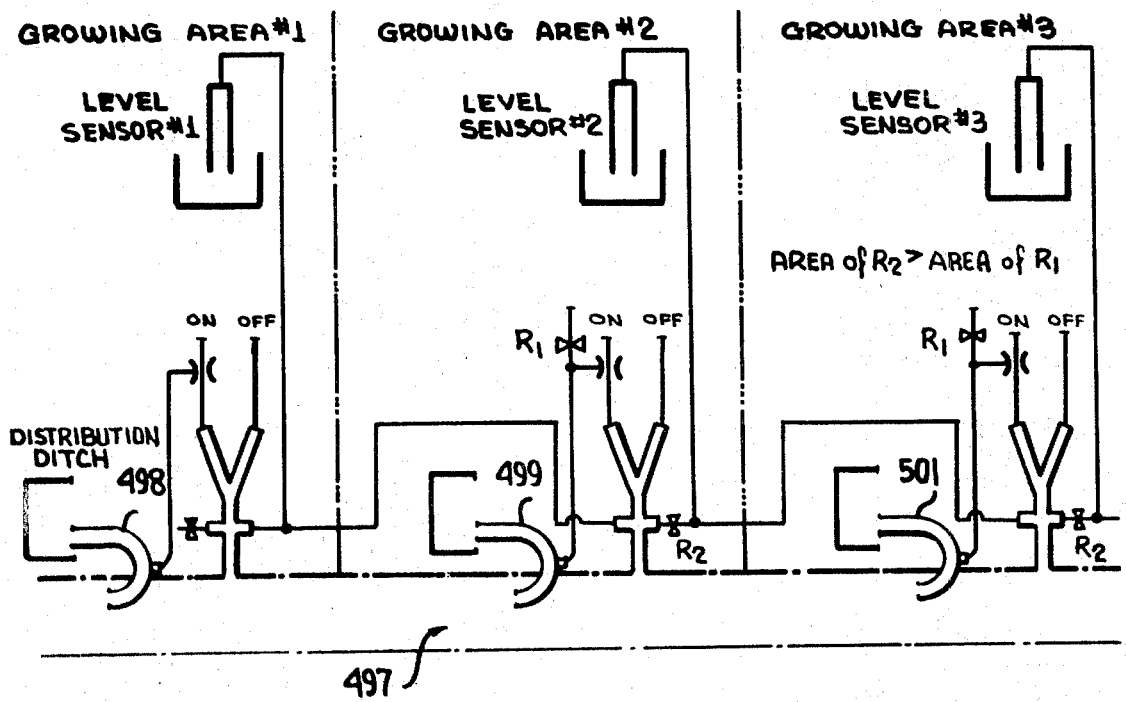

An automated fluidically controlled siphon irrigation system is illustrated diagrammatically in FIGS. 4 and 5. Referring first to FIG. 4, each growing area (No. 1, No. 2, No. 3,etc.) is serviced by a large fluidically controlled siphon of the type described above in relation to FIG. 1. Water from a main supply ditch 495 enters a lateral ditch 497 by means of a controlled gate 496, for example of the roller curtain type described in my referenced U.S. Pat. application Ser. No. 842,599. When water is supplied to lateral ditch 497, siphon 498 associated with the growing area No. 1 discharges into a distribution ditch which feeds the crop furrows in growing area No. 1. When the level sensor in growing area No. 1 and associated with fluidically controlled siphon 498 is actuated, flow through the siphon 498 terminates and the next fluidically controlled siphon 499, associated with growing area No. 2, and which is interlocked with the operation of siphon 498, permits flow until it is turned off by the level sensor in growing area No. 2. Fluidically controlled siphon 501, associated with growing area No. 3, begins to flow at this time, and the cycle thus continues until all growing areas along lateral ditch 497 have been irrigated.

The logic sequence associated with the system of FIG. 4 is illustrated in greater detail in FIG. 5. In operation, a fluidic diverter associated with fluidically controlled siphon 498 permits flow through its left outlet channel, designated as the ON channel in FIG. 5, as soon as the water level in lateral ditch 497 covers the upstream side of siphon 498. This is because more air can be aspirated into the right control port of the diverter from the level sensor growing area No. 1 than is aspirated into the restricted left control port. Siphon 498 permits flow to fill the distribution ditch associated with growing area No. 1 and terminates when the level sensor in growing area No. 1 indicates the desired liquid level has been achieved. The liquid level sensor in growing area 1, in addition to supplying air to the right control nozzle of the diverter associated with siphon 498, also supplies most of the air to the left or bias control nozzle of the fluidic diverter associated with siphon 499. The additional air is supplied through the small restricting orifice $R_1$. Thus, prior to liquid in growing area No. 1 achieving the desired level, the combined air flows, from the sensor in area No. 1 and $R_1$, act to maintain the diverter associated with siphon 499 in its off condition. When air flow through the level sensor in area No. 1 terminates therefore, in addition to turning off the diverter associated with siphon 498, it also turns on the diverter associated with siphon 499, since the air flow through restricting orifice $R_2$ is greater than through $R_1$. At this time flow through siphon 499 commences into its associated distribution ditch filling growing area No. 2. When level sensor No. 2 detects the reference level in growing area 2, aspirated air flow through $R_2$ to the right control nozzle of the diverter associated with siphon 499 terminates. In addition, most of aspirated air flow to the left or bias control nozzle of the diverter associated with siphon 501 terminates. Consequently siphon 499 turns off as a result of the aspirated air flow through $R_1$, and siphon 501 turns on and irrigation of growing area No. 3 commences.

The siphon flow period for any and all of the growing areas can be controlled using either the fill or time interval logic arrangements described hereinabove. The siphon units 498 499 and 501 may either be portable, such as diagrammatically illustrated in FIG. 4, or may be permanently installed between lateral ditch 497 and the various distribution ditches in the growing areas.

In many low slope irrigation systems, mechanical gates, of either the surface overflow or submerged types, are employed to transfer irrigation water from lateral ditches to the growing areas. These systems can be automated using the same basic fluidic logic described above in relation to FIGS. 4 and 5. Also, depending upon specific structural configuration, variations of the leaky bucket actuator and roller curtain gate described in my above-mentioned co-pending U.S. Pat. application Ser. No. 842,599 are readily adaptable to these systems.

While I have described and illustrated specific embodiments of my invention, it will be clear that variations of the details of construction which are specifically illustrated and described may be resorted to without departing from the true spirit and scope of the invention as defined in the appended claims. I claim:

1. In combination:
    a siphon tube, having an elevated section, for selectively conducting liquid flow between two locations;
    a fluid flow passage including a relatively narrow flow section;
    fluid conduction means interconnecting said narrow section of said flow passage and the uppermost portion of said elevated section of said siphon tube; and
    means for selectively flowing fluid through said flow passage at sufficient velocity to aspirate air present in said elevated section of said siphon tube via said fluid conduction means.

2. The combination according to claim 1 further comprising means for selectively adjusting the height of said elevated section of said siphon tube.

3. The combination according to claim 2 wherein said siphon tube has an inlet end disposed at a first elevation lower than said elevated section, and an outlet end disposed at a second elevation lower than said first elevation, and wherein said means for adjusting includes means to permit swiveling of said elevated section relative to said inlet and outlet ends.

4. The combination according to claim 1 utilized to selectively flow liquid from a liquid supply to a predetermined location, wherein said siphon tube includes an inlet end disposed at said liquid supply and an outlet end emptying into said predetermined location, said inlet end being disposed at a higher elevation than said outlet end but at a lower elevation than said elevated section, and wherein said fluid flow passage is an outlet passage of a fluidic element of the type wherein a power stream of pressurized fluid is controllably deflected into and out of said outlet passage.

5. A system for flowing liquid into a plurality of predetermined locations, according to a predetermined sequence, said system including a plurality of combinations according to claim 4, one combination for each predetermined location, the fluidic element in each combination comprising:
    an interaction region having at least one sidewall positioned such that said power stream has a stable flow condition wherein it attaches to said sidewall and flows into said outlet passage when the pressure proximate said sidewall is relatively low;
    a control port communicating with said interaction region through said sidewall, said control port being positioned to be aspirated by said power stream;
    and wherein each combination further comprises:
    a liquid level sensor disposed in said predetermined location;
    a fluid passage interconnecting said liquid level sensor and the control port in fluidic element of the next combination in said predetermined sequence;
    wherein said liquid level sensor includes means responsive to the liquid level in said predetermined location being below a specified level for conducting ambient air into said fluid passage for aspiration through said control port by said power stream, and responsive to the liquid level in said predetermined area being above said specified level for blocking ambient air flow into said fluid passage and said control port.

6. A fluidically controlled siphon for selectively flowing liquid between a liquid container and a channel, said siphon comprising:
    a catch basin having a discharge flume;
    a siphon tube having an upstream end in fluid communication with the interior of said container at a predetermined depth, a downstream end disposed to discharge siphon flow into said catch basin at a level below said discharge flume, and a gooseneck section disposed at a higher level than both the upstream and downstream ends of said siphon tube;
    a fluidic diverter element having at least one outlet passage; and
    means for aspirating air from the uppermost portion of the gooseneck section of said siphon tube in response to fluid flow through said outlet passage of of said fluidic diverter element.

7. The combination according to claim 6 further comprising means for selectively adjusting the height of said uppermost portion of the gooseneck section of said siphon tube, whereby the negative pressure produced by said means for aspirating and required to effect liquid flow through said gooseneck section may be changed at will.

8. The combination according to claim 7 wherein said means for adjusting includes fluid coupling means between said gooseneck section and said upstream and downstream ends arranged to permit said gooseneck section to swivel relative to said upstream and downstream ends.

9. A fluidically controlled siphon for controllably flowing liquid from a liquid container to a channel, said siphon comprising:
    a catch basin having a discharge flume;
    a siphon tube having an upstream end in fluid communication with the interior of said container at a predetermined depth, a downstream end disposed to discharge siphon flow into said catch basin at a level below said discharge flume, and a gooseneck section disposed at a higher level than both the upstream and downstream end of said siphon tube;
    a fluidic amplifier having at least one outlet passage and a venturi section serially disposed in said outlet passage;

a suction tube having one end in flow communication with the uppermost portion of the gooseneck section of said siphon tube and a second end in fluid communication with the venturi section in said outlet passage to permit entrainment of ambient air from said gooseneck section of said siphon tube by fluid flow through the venturi section of said outlet passage.

10. In combination:

a fluidic diverter element adapted for use in a specified ambient fluid environment to selectively distribute a working fluid between at least two flow paths, said working fluid having a greater density than said ambient fluid, said element comprising:

an interaction region;

a power nozzle having an inlet opening and responsive to application of pressurized working fluid to said inlet opening for issuing a power stream of said working fluid into said interaction region;

at least one outlet passage having an ingress opening disposed for receiving said power stream at the downstream end of said interaction region, said outlet passage having an open downstream end;

weir means for preventing outflow of said working fluid from the open downstream end of said outlet passage unless the fluid pressure at the ingress opening of said outlet passage exceeds a predetermined minimum pressure; and control means for selectively deflecting said power stream relative to said outlet passage such that for at least one position of said power stream the fluid pressure at the ingress opening of said at least one outlet passage exceeds said predetermined minimum pressure;

a second outlet passage having an ingress opening disposed for receiving said power stream at the downstream end of said interaction region, said one and said second outlet passages being separated by a flow splitter, said second outlet passage having an open downstream end;

further weir means for preventing outflow of said working fluid from the open downstream end of second outlet passage unless the fluid pressure at the ingress opening of said second outlet passage exceeds a specified minimum pressure; and first and second sidewalls for said interaction region, said sidewalls being positioned such that said power stream can lock onto either sidewall, and wherein said power stream is directed toward said one outlet passage and exceeds said predetermined minimum pressure thereat when locked onto said first sidewall and is directed toward said second outlet passagea and exceeds said predetermined minimum pressure thereat when locked onto said second sidewall; and wherein said control means comprises first and second vortex chambers projecting outwardly from said interaction region through said first and second sidewalls respectively, each of said vortex chambers being disposed to receive respective small portions of power stream fluid tangentially of the vortex chamber to create vortical flow therein, each vortex chamber having a respective one of first and second control ports communicating between ambient fluid and said vortex chamber axially of said vortical flow, whereby said vortical flow creates a suction at said control port to induce inflow of ambient fluid into said interaction region;

wherein said working fluid to be distributed is stored in a container, said combination further comprising:

a catch basin having a discharge flume;

a siphon tube having an upstream end in fluid communication with the interior of said container, a downstream end disposed to discharge flow through said siphon tube into said catch basin at a level below said discharge flume; and a gooseneck section disposed at a higher level than both the upstream and downstream ends of said siphon tube;

a suction tube having one end in flow communication with the uppermost portion of the gooseneck section of said siphon tube and a second end extending into the open downstream end of said second outlet passage of said fluidic diverter element and terminating at a level slightly above the level of said further weir means to permit inflow of ambient fluid to the second end of said suction tube when working fluid is not flowing out of said second outlet passage and to permit aspiration of ambient fluid from said gooseneck section of said siphon tube by working fluid outflow through said second outlet passage; and a control tube interconnecting said suction tube and said second control port for permitting inflow of ambient fluid to said control port from the second end of said suction tube when no working fluid flows out of said second outlet passage.

* * * * *